United States Patent
Mazumdar et al.

(10) Patent No.: US 9,090,730 B1
(45) Date of Patent: Jul. 28, 2015

(54) RUBBER COMPOSITION AND PNEUMATIC TIRE

(71) Applicant: The Goodyear Tire & Rubber Company, Akron, OH (US)

(72) Inventors: Arindam Mazumdar, Stow, OH (US); Paul Harry Sandstrom, Cuyahoga Falls, OH (US); Liqing Ma, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/463,187

(22) Filed: Aug. 19, 2014

(51) Int. Cl.
*C08L 9/00* (2006.01)
*C08F 36/06* (2006.01)
*C08K 3/36* (2006.01)
*C08K 3/04* (2006.01)
*C08L 9/06* (2006.01)
*C08L 7/00* (2006.01)

(52) U.S. Cl.
CPC . *C08F 36/06* (2013.01); *C08K 3/04* (2013.01); *C08K 3/36* (2013.01); *C08L 7/00* (2013.01); *C08L 9/00* (2013.01); *C08L 9/06* (2013.01)

(58) Field of Classification Search
None
See application file for complete search history.

(56) References Cited

U.S. PATENT DOCUMENTS

| | | |
|---|---|---|
| 4,935,471 A | 6/1990 | Halasa et al. |
| 5,128,416 A * | 7/1992 | Imai et al. ............... 525/254 |
| 5,332,810 A | 7/1994 | Lawson et al. |
| 5,508,333 A | 4/1996 | Shimizu |
| 5,552,473 A | 9/1996 | Lawson et al. |
| 5,574,109 A | 11/1996 | Lawson et al. |
| 5,605,872 A | 2/1997 | Engel et al. |
| 5,610,237 A | 3/1997 | Lawson et al. |
| 5,616,704 A | 4/1997 | Lawson et al. |
| 5,625,017 A * | 4/1997 | Morita et al. ............ 526/180 |
| 5,785,778 A | 7/1998 | Lawson et al. |
| 5,786,441 A | 7/1998 | Lawson et al. |
| 5,798,418 A | 8/1998 | Quirk |
| 5,866,650 A | 2/1999 | Lawson et al. |
| 5,912,313 A * | 6/1999 | McIntosh et al. ......... 526/279 |
| 5,919,870 A | 7/1999 | Letchford et al. |
| 6,025,450 A | 2/2000 | Lawson et al. |
| 6,080,835 A | 6/2000 | Lawson et al. |
| 6,349,753 B1 | 2/2002 | Lawson et al. |
| 7,202,306 B2 * | 4/2007 | Tanaka et al. ............ 525/331.9 |
| 8,252,863 B2 | 8/2012 | Hasse et al. |
| 8,952,101 B2 * | 2/2015 | Sasajima et al. ......... 525/342 |
| 2002/0137843 A1 * | 9/2002 | Kwag et al. .............. 525/100 |
| 2006/0004143 A1 * | 1/2006 | Inagaki et al. ............ 525/192 |
| 2007/0049669 A1 * | 3/2007 | Korth et al. .............. 524/188 |
| 2008/0103261 A1 * | 5/2008 | Tanaka et al. ............ 525/331.9 |
| 2008/0177017 A1 * | 7/2008 | Suzuki et al. ............ 526/310 |
| 2011/0054095 A1 * | 3/2011 | Yukimura et al. ......... 524/188 |
| 2011/0091708 A1 * | 4/2011 | Noda et al. ............... 428/220 |
| 2011/0251308 A1 | 10/2011 | Galvan et al. |
| 2012/0041134 A1 * | 2/2012 | Ito et al. .................. 524/547 |
| 2012/0041135 A1 * | 2/2012 | Ito et al. .................. 524/547 |
| 2012/0252966 A1 * | 10/2012 | Ito .......................... 524/575 |
| 2012/0270997 A1 * | 10/2012 | Tanaka et al. ............ 524/572 |

* cited by examiner

*Primary Examiner* — Robert S Loewe
(74) *Attorney, Agent, or Firm* — John D. DeLong

(57) ABSTRACT

The present invention is directed to a rubber composition comprising a bifunctionalized elastomer comprising the reaction product of 1) a living anionic elastomeric polymer initiated with a functional initiator and 2) a functional polymerization terminator; and a filler selected from silica and carbon black. The invention is further directed to a pneumatic tire comprising the rubber composition.

20 Claims, 5 Drawing Sheets

RUBBER COMPOSITION AND PNEUMATIC TIRE

BACKGROUND OF THE INVENTION

In recent years, there is a growing demand for functionalized polymers. Functionalized polymers can be synthesized through various living/controlled polymerization techniques. In the living polymerization process based on active carbanionic center, metals from Groups I and II of the periodic table are commonly used to initiate the polymerization of monomers into polymers. For example, lithium, barium, magnesium, sodium, and potassium are metals that are frequently utilized in such polymerizations. Initiator systems of this type are of commercial importance because they can be used to produce stereo regulated polymers. For instance, lithium initiators can be utilized to initiate the anionic polymerization of isoprene into synthetic polyisoprene rubber or to initiate the polymerization of 1,3-butadiene into polybutadiene rubber having the desired microstructure.

The polymers formed in such polymerizations have the metal used to initiate the polymerization at the growing end of their polymer chains and are sometimes referred to as living polymers. They are referred to as living polymers because their polymer chains which contain the terminal metal initiator continue to grow or live until all of the available monomer is exhausted. Polymers that are prepared by utilizing such metal initiators normally have structures which are essentially linear and normally do not contain appreciable amounts of branching.

This invention details synthesis of functionalized polymers. In general to achieve the best tire performance properties functionalized polymers are highly desirable. In order to reduce the rolling resistance and to improve the tread wear characteristics of tires, functionalized elastomers having a high rebound physical property (low hysteresis) have been used for the tire tread rubber compositions. However, in order to increase the wet skid resistance of a tire tread, rubbery polymers that have a relatively lower rebound physical property (higher hysteresis) which thereby undergo a greater energy loss, have sometimes been used for such tread rubber compositions. To achieve such relatively inconsistent viscoelastic properties for the tire tread rubber compositions, blends (mixtures) of various types of synthetic and natural rubber can be utilized in tire treads.

Functionalized rubbery polymers made by living polymerization techniques are typically compounded with sulfur, accelerators, antidegradants, a filler, such as carbon black, silica or starch, and other desired rubber chemicals and are then subsequently vulcanized or cured into the form of a useful article, such as a tire or a power transmission belt. It has been established that the physical properties of such cured rubbers depend upon the degree to which the filler is homogeneously dispersed throughout the rubber. This is in turn related to the level of affinity that filler has for the particular rubbery polymer. This can be of practical importance in improving the physical characteristics of rubber articles which are made utilizing such rubber compositions. For example, the rolling resistance and traction characteristics of tires can be improved by improving the affinity of carbon black and/or silica to the rubbery polymer utilized therein. Therefore, it would be highly desirable to improve the affinity of a given rubbery polymer for fillers, such as carbon black and silica.

In tire tread formulations, better interaction between the filler and the rubbery polymer results in lower hysteresis and consequently tires made with such rubber formulations have lower rolling resistance and in some cases improved tread wear. Low tan delta values at 60° C. are indicative of low hysteresis and consequently tires made utilizing such rubber formulations with low tan delta values at 60° C. normally exhibit lower rolling resistance. Better interaction between the filler and the rubbery polymer in tire tread formulations also typically results in higher tan delta values at 0° C. which is indicative of better traction characteristics.

The interaction between rubber and carbon black has been attributed to a combination of physical absorption (van der Waals force) and chemisorption between the oxygen containing functional groups on the carbon black surface and the rubber (see D. Rivin, J. Aron, and A. Medalia, Rubber Chem. & Technol. 41, 330 (1968) and A. Gessler, W. Hess, and A Medalia, Plast. Rubber Process, 3, 141 (1968)). Various other chemical modification techniques, especially for styrene-butadiene rubber made by solution polymerization (S-SBR), have also been described for reducing hysteresis loss by improving polymer-filler interactions. In one of these techniques, the solution rubber chain end is modified with aminobenzophenone. This greatly improves the interaction between the polymer and the oxygen-containing groups on the carbon black surface (see N. Nagata, Nippon Gomu Kyokaishi, 62, 630 (1989)). Tin coupling of anionic solution polymers is another commonly used chain end modification method that aids polymer-filler interaction supposedly through increased reaction with the quinone groups on the carbon black surface. The effect of this interaction is to reduce the aggregation between carbon black particles which in turn, improves dispersion and ultimately reduces hysteresis. Functionalization of a solution polymerized rubber chain end using a functionalized lithium initiator may also be used.

SUMMARY OF THE INVENTION

The subject invention provides for the end-group functionalization of rubbery living polymers to improve their affinity for fillers, such as carbon black and/or silica. Such functionalized polymers can be beneficially used in manufacturing tires and other rubber products where improved polymer/filler interaction is desirable. In tire tread compounds this can result in lower polymer hysteresis which in turn can provide a lower level of tire rolling resistance.

The present invention is directed to a bifunctionalized elastomer comprising the reaction product of 1) a living anionic elastomeric polymer initiated with a functional initiator and 2) a functional polymerization terminator, wherein 1) the living anionic elastomeric polymer initiated with a functional initiator is of formula AYLi where Y is a divalent polymer radical, Li is a lithium atom bonded to a carbon atom of Y, and A is an amine-containing radical having the formula X

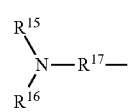

(X)

wherein $R^{15}$ and $R^{16}$ independently have from 1 to 20 carbon atoms and each are independently an alkyl group, a cycloalkyl group, an aromatic group, a substituted alkyl group, a substituted cycloalkyl group or a substituted aromatic group, or $R^{15}$ and $R^{16}$ taken together with the nitrogen to which both $R^{15}$ and $R^{16}$ are attached comprise a heterocyclic amine group wherein $R^{15}$ and $R^{16}$ taken together form an alkanediyl group of from 4 to 20 carbon atoms or a substituted alkanediyl group of from 4 to 20 carbon atoms, and $R^{17}$ is a covalent bond, an alkanediyl group of from 1 to 20 carbon atoms or a substituted alkanediyl group of from 1 to 20 carbon atoms; and 2) the functional polymerization terminator is of formula I

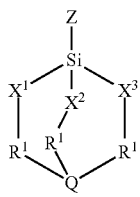
(I)

wherein $R^1$ is C1 to C4 linear alkyl, or C1 to C4 branched alkanediyl;

$X^1$, $X^2$, $X^3$ are independently O, S, or a group of formula (II) or (III)

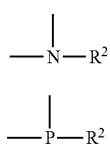
(II)

(III)

where $R^2$ is C1 to C18 linear or branched alkyl;

Z is $R^3$, —$OR^4$, or —$R^5$—$X^4$; $R^3$, $R^4$ are independently C1 to C18 linear or branched alkyl; $R^5$ is C1 to C18 alkanediyl or dialkyl ether diyl;

$X^4$ is halogen or a group of structure IV, V, VI, VII or VIII

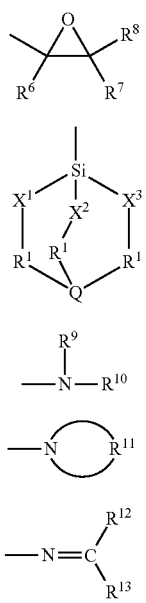

(IV)

(V)

(VI)

(VII)

(VIII)

wherein $R^6$, $R^7$, $R^8$, $R^9$, and $R^{10}$ are independently H or C1 to C8 alkyl; $R^{11}$ is C2 to C8 alkanediyl; $R^{12}$ and $R^{13}$ are independently H, aryl or C1 to C8 alkyl;

Q is N or a group of structure IX

(IX)

wherein $R^{14}$ is C1 to C8 alkyl.

The invention is further directed to a pneumatic tire comprising the rubber composition.

DETAILED DESCRIPTION OF THE INVENTION

Figure 1:
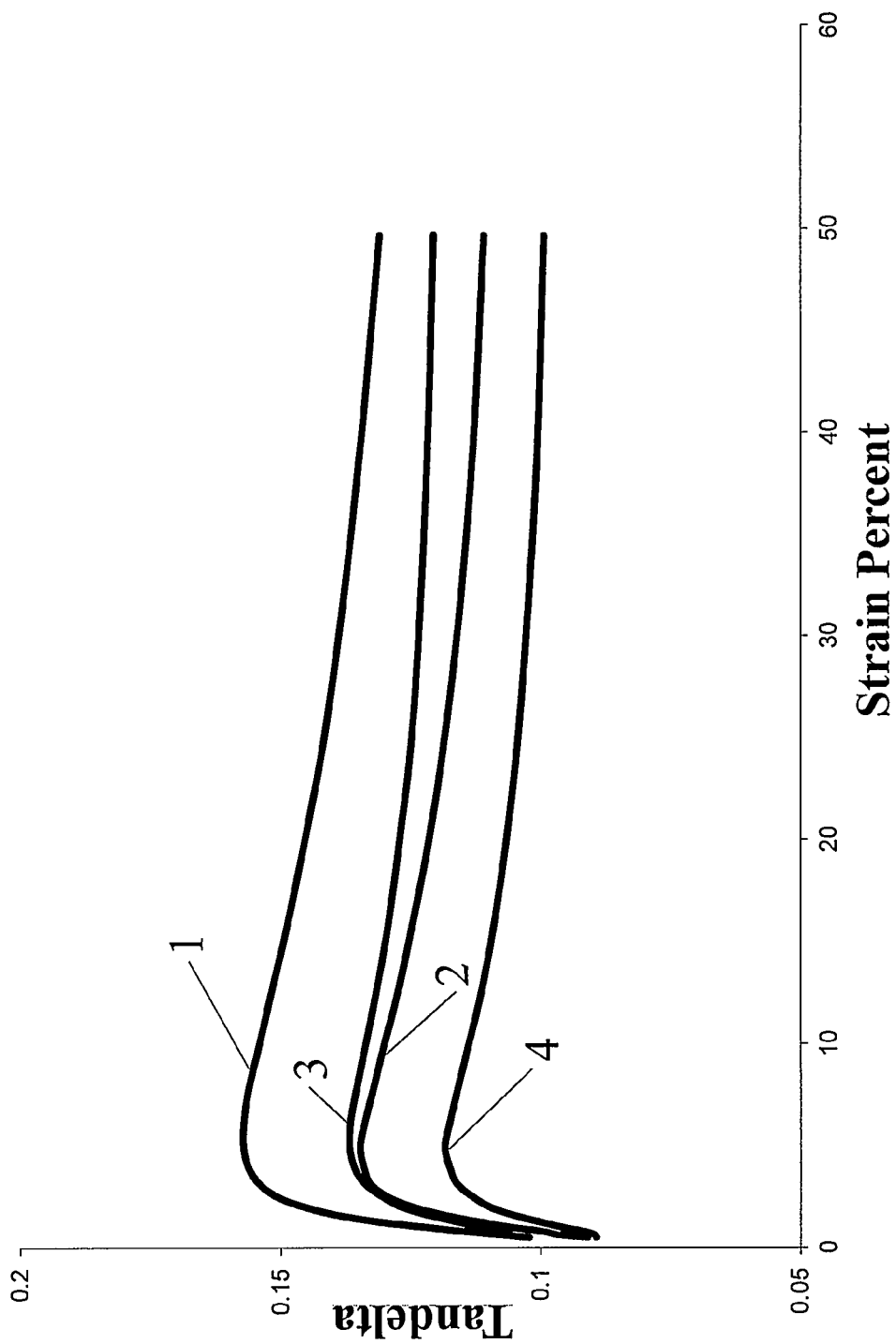
FIG. 1 shows a graph of tan delta versus strain for several rubber samples.

There is disclosed a bifunctionalized elastomer comprising the reaction product of 1) a living anionic elastomeric polymer initiated with a functional initiator and 2) a functional polymerization terminator, wherein 1) the living anionic elastomeric polymer initiated with a functional initiator is of formula AYLi where Y is a divalent polymer radical, Li is a lithium atom bonded to a carbon atom of Y, and A is an amine-containing radical having the formula X

(X)

wherein $R^{15}$ and $R^{16}$ independently have from 1 to 20 carbon atoms and each are independently an alkyl group, a cycloalkyl group, an aromatic group, a substituted alkyl group, a substituted cycloalkyl group or a substituted aromatic group, or $R^{15}$ and $R^{16}$ taken together with the nitrogen to which both $R^{15}$ and $R^{16}$ are attached comprise a heterocyclic amine group wherein $R^{15}$ and $R^{16}$ taken together form an alkanediyl group of from 4 to 20 carbon atoms or a substituted alkanediyl group of from 4 to 20 carbon atoms, and $R^{17}$ is a covalent bond, an alkanediyl group of from 1 to 20 carbon atoms or a substituted alkanediyl group of from 1 to 20 carbon atoms; and 2) the functional polymerization terminator is of formula I

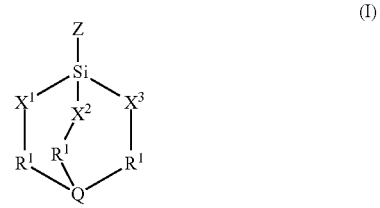
(I)

wherein R¹ is C1 to C4 linear alkyl, or C1 to C4 branched alkanediyl;

X¹, X², X³ are independently O, S, or a group of formula (II) or (III)

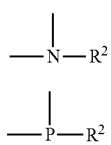
(II)

(III)

where R² is C1 to C18 linear or branched alkyl;

Z is R³, —OR⁴, or —R⁵—X⁴; R³, R⁴ are independently C1 to C18 linear or branched alkyl; R⁵ is C1 to C18 alkanediyl or dialkyl ether diyl;

X⁴ is halogen or a group of structure IV, V, VI, VII or VIII

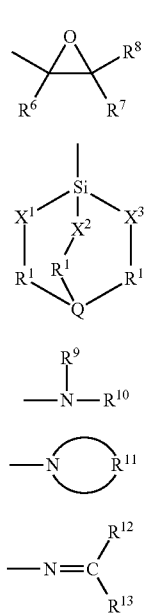
(IV)

(V)

(VI)

(VII)

(VIII)

wherein R⁶, R⁷, R⁸, R⁹, and R¹⁰ are independently H or C1 to C8 alkyl; R¹¹ is C2 to C8 alkanediyl; R¹² and R¹³ are independently H, aryl or C1 to C8 alkyl;

Q is N or a group of structure IX

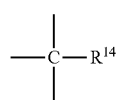
(IX)

wherein R¹⁴ is C1 to C8 alkyl.

There is further disclosed a rubber composition comprising the functionalized elastomer, and a pneumatic tire comprising the rubber composition.

The subject invention provides a means for the end-group bifunctionalization of rubbery living polymers to improve their affinity for fillers, such as carbon black and/or silica, through use of both a functional polymerization initiator and a functional polymerization terminator. The process of the present invention can be used to functionalize any living polymer which is terminated with a metal of group I or II of the periodic table. These polymers can be produced utilizing techniques that are well known to persons skilled in the art. The metal terminated rubbery polymers that can be functionalized with a terminator of formula I in accordance with this invention can be made utilizing monofunctional initiators having the general structural formula P-M, wherein P represents a polymer chain and wherein M represents a metal of group I or II.

The initiator used to initiate the polymerization employed in synthesizing the living rubbery polymer that is functionalized in accordance with this invention is typically selected from the group consisting of barium, lithium, magnesium, sodium, and potassium. Lithium and magnesium are the metals that are most commonly utilized in the synthesis of such metal terminated polymers (living polymers). Normally, lithium initiators are more preferred.

Organolithium compounds are the preferred initiators for utilization in such polymerizations. The organolithium compounds which are utilized as initiators are normally organo monolithium compounds. The organolithium compounds which are preferred as initiators are monofunctional compounds which can be represented by the formula: R-Li, wherein R represents a hydrocarbyl radical. In the present invention, polymerization of a monomer in the presence of the initiator forms a living anionic elastomeric polymer of formula AYLi where Y is a divalent polymer radical, Li is a lithium atom bonded to a carbon atom of Y, and A is an amine-containing radical having the formula X

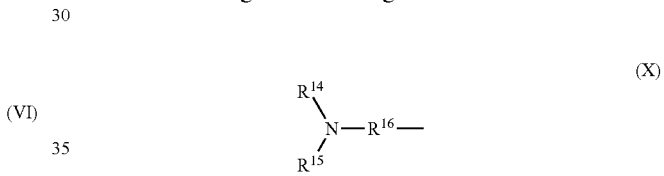
(X)

wherein R¹⁴ and R¹⁵ independently have from 1 to 20 carbon atoms and each are independently an alkyl group, a cycloalkyl group, an aromatic group, a substituted alkyl group, a substituted cycloalkyl group or a substituted aromatic group, or R¹⁴ and R¹⁵ taken together with the nitrogen to which both R¹⁴ and R¹⁵ are attached comprise a heterocyclic amine group wherein R¹⁴ and R¹⁵ taken together form an alkanediyl group of from 4 to 20 carbon atoms or a substituted alkanediyl group of from 4 to 20 carbon atoms, and R¹⁶ is a covalent bond, an alkanediyl group of from 1 to 20 carbon atoms or a substituted alkanediyl group of from 1 to 20 carbon atoms. Thus the initiator is of formula R-Li with R replaced by the structure of formula X.

In one embodiment, the organolithium initiator is an N, N-dialkylamino alkyllithium such as 3-(N, N-dimethylamino)-1-propyllithium, 3-(N, N-dimethylamino)-2-methyl-1-propyllithium, 3-(N, N-dimethylamino)-2,2-dimethyl-1-propyllithium, 4-(N, N-dimethylamino)-1-butyllithium, 5-(N, N-dimethylamino)-1-pentyllithium, 6-(N, N-dimethylamino)-1-hexyllithium, 8-(N, N-dimethylamino)-1-propyllithium, and the like. Correspondingly in this embodiment, in formula X the group structure is N, N-dialkylamino alkyl such as 3-(N, N-dimethylamino)-1-propyl, 3-(N, N-dimethylamino)-2-methyl-1-propyl, 3-(N, N-dimethylamino)-2,2-dimethyl-1-propyl, 4-(N, N-dimethylamino)-1-butyl, 5-(N, N-dimethylamino)-1-pentyl, 6-(N, N-dimethylamino)-1-hexyl, 8-(N, N-dimethylamino)-1-propyl, and the like.

In one embodiment, the organolithium initiator is an azacycloalkyl alkyllithium such as 3-piperidino-1-propyllithium, 3-pyrrolidino-1-propyllithium, and the like. Correspondingly in this embodiment, in formula X the group structure is 3-piperidino-1-propyl, 3-pyrrolidino-1-propyl, and the like. In one embodiment, the group is 3-pyrrolidino-1-propyl and the initiator is 3-pyrrolidino-1-propyllithium.

The amount of organolithium initiator utilized will vary depending upon the molecular weight which is desired for the rubbery polymer being synthesized as well as the precise polymerization temperature which will be employed. The precise amount of organolithium compound required to produce a polymer of a desired molecular weight can be easily ascertained by persons skilled in the art. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

Many types of unsaturated monomers which contain carbon-carbon double bonds can be polymerized into polymers using such metal catalysts. Elastomeric or rubbery polymers can be synthesized by polymerizing diene monomers utilizing this type of metal initiator system. The diene monomers that can be polymerized into synthetic rubbery polymers can be either conjugated or nonconjugated diolefins. Conjugated diolefin monomers containing from 4 to 8 carbon atoms are generally preferred. Vinyl-substituted aromatic monomers can also be copolymerized with one or more diene monomers into rubbery polymers, for example styrene-butadiene rubber (SBR). Some representative examples of conjugated diene monomers that can be polymerized into rubbery polymers include 1,3-butadiene, isoprene, 1,3-pentadiene, 2,3-dimethyl-1,3-butadiene, 2-methyl1,3-pentadiene, 2,3-dimethyl-1,3-pentadiene, 2-phenyl-1,3-butadiene, and 4,5-diethyl-1,3-octadiene. Some representative examples of vinyl-substituted aromatic monomers that can be utilized in the synthesis of rubbery polymers include styrene, 1-vinylnapthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, 3-ethyl-1-vinylnapthalene, 6-isopropyl-1-vinylnapthalene, 6-cyclohexyl-1-vinylnaphthalene, 7-dodecyl-2-vinylnaphthalene, α-methylstyrene, and the like.

The metal terminated rubbery polymers that are functionalized with a terminator of formula I in accordance with this invention are generally prepared by solution polymerizations that utilize inert organic solvents, such as saturated aliphatic hydrocarbons, aromatic hydrocarbons, or ethers. The solvents used in such solution polymerizations will normally contain from about 4 to about 10 carbon atoms per molecule and will be liquids under the conditions of the polymerization. Some representative examples of suitable organic solvents include pentane, isooctane, cyclohexane, normal-hexane, benzene, toluene, xylene, ethylbenzene, tetrahydrofuran, and the like, alone or in admixture. For instance, the solvent can be a mixture of different hexane isomers. Such solution polymerizations result in the formation of a polymer cement (a highly viscous solution of the polymer).

The metal terminated living rubbery polymers utilized in the practice of this invention can be of virtually any molecular weight. However, the number average molecular weight of the living rubbery polymer will typically be within the range of about 50,000 to about 500,000. It is more typical for such living rubbery polymers to have number average molecular weights within the range of 100,000 to 250,000.

The metal terminated living rubbery polymer can be functionalized by simply adding a stoichiometric amount of a terminator of formula I to a solution of the rubbery polymer (a rubber cement of the living polymer). In other words, approximately one mole of the terminator of formula I is added per mole of terminal metal groups in the living rubbery polymer. The number of moles of metal end groups in such polymers is assumed to be the number of moles of the metal utilized in the initiator. It is, of course, possible to add greater than a stoichiometric amount of the terminator of formula I. However, the utilization of greater amounts is not beneficial to final polymer properties. Nevertheless, in many cases it will be desirable to utilize a slight excess of the terminator of formula I to insure that at least a stoichiometric amount is actually employed or to control the stoichiometry of the functionalization reaction. In most cases from about 1.2 to about 2 moles of the terminator of formula I will be utilized per mole of metal end groups in the living polymer being treated. In the event that it is not desired to functionalize all of the metal terminated chain ends in a rubbery polymer then, of course, lesser amounts of the terminator of formula I can be utilized.

The terminator of formula I will react with the metal terminated living rubbery polymer over a very wide temperature range. For practical reasons the functionalization of such living rubbery polymers will normally be carried out at a temperature within the range of 0° C. to 150° C. In order to increase reaction rates, in most cases it will be preferred to utilize a temperature within the range of 20° C. to 100° C. with temperatures within the range of 50° C. to 80° C. being most preferred. The capping reaction is very rapid and only very short reaction times within the range of 0.1 to 2 hours are normally required. However, in some cases reaction times of up to about 24 hours may be employed to insure maximum conversions.

In one embodiment, the terminator of formula I has one of the structures shown in Table 1.

TABLE 1

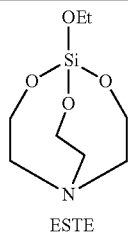

ESTE

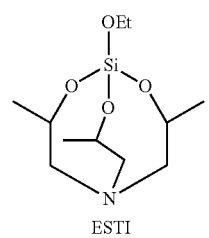

ESTI

TABLE 1-continued
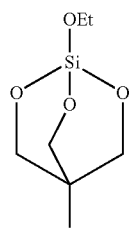
ESTM
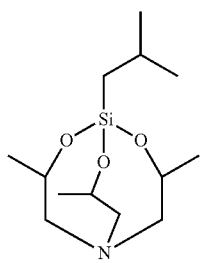
BSTI
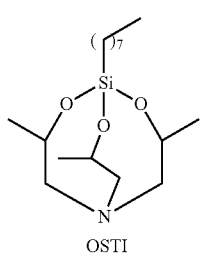
OSTI
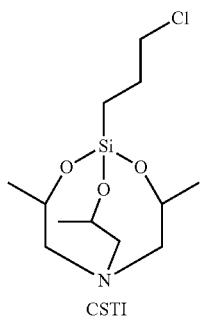
CSTI
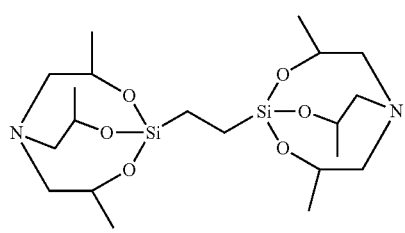
BIPOS
TABLE 1-continued
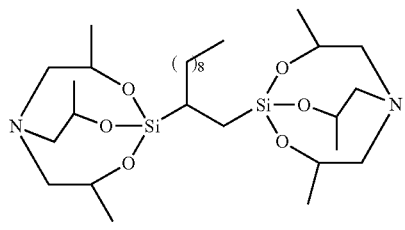
BIDECS
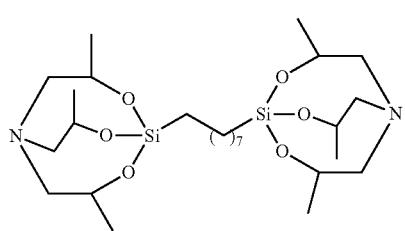
BIOCTS
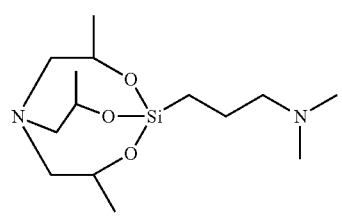
DMASTI
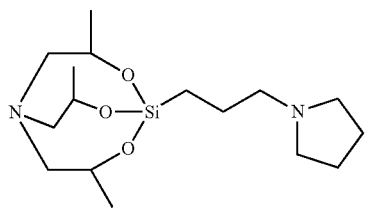
PYSTI
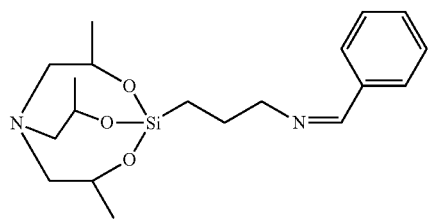
BIMSTI
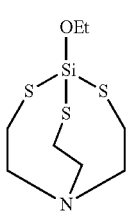
ETTS TABLE 1-continued

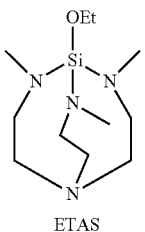

ETAS

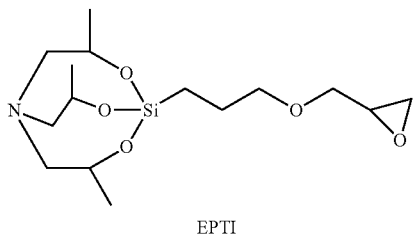 [SMILES: CC1CN2CC(C)O[Si](CCCOCC3CO3)(O1)OC(C)C2 ; "EPTI"]

EPTI

| | |
|---|---|
| ESTE: | 1-ethoxy-2,8,9-trioxa-5-aza-1-silabicyclo[3.3.3]undecane, |
| ESTI: | or ethoxysilatrane1-ethoxy-3,7,10-trimethyl-2,8,9-trioxa-5-aza-1-silabicyclo[3.3.3]undecane, or 1-ethoxy-3,7,10-trimethylsilatrane |
| ESTM: | 1-ethoxy-4-methyl-2,6,7-trioxa-1-silabicyclo[2.2.2]octane |
| BSTI: | 1-isobutyl-3,7,10-trimethyl-2,8,9-trioxa-5-aza-1-silabicyclo[3.3.3]undecane, or 1-isobuty1-3,7,10-trimethylsilatrane |
| OSTI: | 1-octyl-3,7,10-trimethyl-2,8,9-trioxa-5-aza-1-silabicyclo[3.3.3]undecane, or 1-octyl-3,7,10-trimethylsilatrane |
| CSTI: | 1-(3-chloropropyl)-3,7,10-trimethyl-2,8,9-trioxa-5-aza-1-silabicyclo[3.3.3]undecane, or 1-(3-chloropropy1)-3,7,10-trimethylsilatrane |
| BIPOS: | 1,2-bis(3,7,10-trimethyl-2,8,9-trioxa-5-aza-1-silabicyclo[3.3.3]undecan-1-yl)ethane, or 1,2-bis(3,7,10-trimethylsilatrane)ethane |
| BIDECS: | 1,1'-(decane-1,2-diyl)bis(3,7,10-trimethyl-2,8,9-trioxa-5-aza-1-silabicyclo[3.3.3]undecane), or 1,1'-(decane-1,2-diyl)bis(3,7,10-trimethylsilatrane) |
| BIOCTS: | 1,8-bis(3,7,10-trimethyl-2,8,9-trioxa-5-aza-1-silabicyclo[3.3.3]undecan-1-yl)octane, or 1,8-bis(3,7,10-trimethylsilatrane)octane |
| DMASTI: | N,N-dimethyl-3-(3,7,10-trimethyl-2,8,9-trioxa-5-aza-1-silabicyclo[3.3.3]undecan-1-yl)propan-1-amine |
| PYSTI: | 3,7,10-trimethyl-1-(3-(pyrrolidin-1-yl)propyl)-2,8,9-trioxa-5-aza-1-silabicyclo[3.3.3]undecane |
| BIMSTI: | N-benzylidene-3-(3,7,10-trimethyl-2,8,9-trioxa-5-aza-1-silabicyclo[3.3.3]undecan-1-yl)propan-1-amine |
| ETTS: | 1-ethoxy-2,8,9-trithia-5-aza-1-silabicyclo[3.3.3]undecane; or 1-ethoxy-thiosilitrane |
| ETAS: | 1-ethoxy-2,8,9-trimethyl-2,5,8,9-tetraaza-1-silabicyclo[3.3.3]undecane; or 1-ethoxy-2,8,9-triazasilatrane |
| EPTI: | 3,7,10-trimethyl-1-(3-(oxiran-2-ylmethoxy)propyl)-2,8,9-trioxa-5-aza-1-silabicyclo[3.3.3]undecane; or 1-(3-(oxiran-2-ylmethoxy)propyl)-3,7,10-trimethylsilatrane |

After the functionalization reaction is completed, it will normally be desirable to "kill" any living polydiene chains which remain. This can be accomplished by adding an alcohol, such as methanol or ethanol, to the polymer cement after the functionalization reaction is completed in order to eliminate any living polymer that was not consumed by the reaction with the terminator of formula I. The end-group functionalized polydiene rubber can then be recovered from the solution utilizing standard techniques.

The functionalized polymer may be compounded into a rubber composition.

The rubber composition may optionally include, in addition to the functionalized polymer, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts*, 2003, 62nd edition, published by the Institute of Petroleum, United Kingdom.

The rubber composition may include silica, carbon black, or a combination of silica and carbon black.

The rubber composition may include from about 1 to about 150 phr of silica. In another embodiment, from 10 to 100 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in combination with silica in an amount ranging from 1 to 150 phr. In another embodiment, from 10 to 100 phr of carbon black may be used. Although carbon black may be used with silica, in one embodiment, essentially no carbon black is used except for an amount required to impart black color to the tire which is from 1 to 10 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 $cm^3/100$ g.

Combinations of silica and carbon black may be used in the composition. In one embodiment, the weight ratio of silica to carbon black is greater than or equal to one.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)$—S—$CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

In this example, pilot scale polymerization of a non-functionalized elastomer is illustrated. Polymerizations were done in a 60-gallon reactor at 65° C. A premix of styrene and butadiene (113.5 kg, 12 wt %) was charged into reactor with hexane followed by addition of modifier (TMEDA, 39-43 mL) and initiator (n-butyllithium, 52-63 mL, 15 wt %). When the conversion was above 98%, the polymerization was terminated with isopropanol. The resulting non-functionalized elastomer was labeled as control Sample 1.

Example 2

In this example, pilot scale polymerization of an end-functionalized elastomer obtained using a functional initiator is illustrated.

Polymerizations were done in a 60-gallon reactor at 65° C. Monomer premix of styrene and butadiene (113.5 kg, 12 wt %) was charged into reactor with hexane as solvent followed by addition of modifier (TMEDA, 39-43 mL) and functional initiator (3-pyrrolidino-1-propyl lithium, 200-250 mL, 5.75 wt %). When the conversion was above 98%, the polymerization was terminated with isopropanol. The resulting monofunctionalized elastomer was labeled as comparative Sample 2.

Example 3

In this example, pilot scale polymerization of an end-functionalized elastomer obtained using a functional terminator is illustrated.

The functional terminator used in the polymerization was produced as follows. Trisopropanolamine (253.0 g, from Aldrich), tetraethylsilicate (289 g, from Aldrich) and potassium hydroxide (3.7 g, form Aldrich) were mixed in a 1-liter 3-neck round bottle flask equipped with distillation apparatus. The mixture was then heated to 85° C. by heating mantle, and ethanol produced from the reaction was removed under reduced pressure of 200 mmHg. After 2 hour of reaction the pressure was set to 100 mmHg, and the mixture was heated to 120° C. for an additional hour. Total of 230 mL of ethanol was recovered from the distillation. The oily crude product was then distilled out under the pressure of −2 mmHg and the temperature of 120° C. Total of 305 g (88.2% yield) of white crystalline solid, 1-ethoxy-3,7,10-trimethylsilatrane (ESTI), was obtained. $^1$HNMR and $^{13}$CNMR spectroscopy analysis has shown greater than 95% purity of the desired product. m.p. 80-83° C.

Polymerizations of solution SBR were done in a 60-gallon reactor at 65° C. Monomer premix of styrene and butadiene (113.5 kg, 12 wt %) was charged into reactor with hexane as solvent followed by addition of modifier (TMEDA, 39-43 mL) and initiator (n-butyllithium, 52-63 mL, 15 wt %). When the conversion was above 98%, the polymerization was terminated with the functional terminator 1-ethoxy-3,7,10-trimethylsilatrane (ESTI). The resulting monofunctionalized elastomer was labeled as comparative Sample 3.

Example 4

This example illustrates pilot scale polymerization of a bifunctionalized elastomer functionalized at both chain ends. The bifunctionalized elastomer was obtained using a functional initiator and a functional terminator.

Polymerizations were done in a 60-gallon reactor at 65° C. Monomer premix of styrene and butadiene (113.5 kg, 12 wt %) was charged into reactor with hexane as solvent followed by addition of modifier (TMEDA, 39-43 mL) and functional initiator (3-pyrrolidino-1-propyl lithium, 200-250 mL, 5.75 wt %.) When the conversion was above 98%, the polymerization was terminated with functional terminator 1-ethoxy-3,7,10-trimethylsilatrane (ESTI). The resulting bifunctionalized elastomer was labeled as inventive Sample 4.

Example 5

The polymers of Examples 1 through 4 were characterized using different techniques, for example, size exclusion chromotography (SEC) for determination of molecular weight, dynamic scanning calorimetry (DSC, inflection at 10° C./min) for determination of Tg, IR for determining cis, trans, styrene and vinyl content, and Mooney viscosity measurements with results given in Tables 2 and 3. Sample 1, the nonfunctional SBR of Example 1, was labeled as control. Sample 2, the monofunctionalized SBR of Example 2 obtained using a functional initiator, was labeled as comparative. Sample 3, the monofunctionalized SBR of Example 3 obtained using a functional terminator, was labeled as comparative. Sample 4, the bifunctionalized SBR of Example 4 obtained using both a functional initiator and a functional terminator, represents the present invention.

TABLE 2

| Polymer Sample | Overall Mn (g/mol) | PDI |
| --- | --- | --- |
| 1: SBR[1] (Control) | 225,000 | 1.02 |
| 2: PPL-SBR[2] | 354,000 | 1.46 |
| 3: ESTI-SBR[3] | 212,000 | 1.04 |
| 4: PPL-ESTI-SBR[4] | 294,000 | 1.28 |

[1]Non-functionalized SBR, from Example 1
[2]Functionalized SBR initiated with pyrrolidino propyllithium (PPL), from Example 2
[3]Functionalized SBR terminated with 1-ethoxy-3,7,10-trimethylsilatrane (ESTI), from Example 3.
[4]Functionalized SBR initiated with PPL and terminated with ESTI, from Example 4.

TABLE 3

| Polymer Sample | Mooney | Cis % | Trans % | Styrene % | Vinyl %[1] | Tg °C. |
| --- | --- | --- | --- | --- | --- | --- |
| 1: SBR (Control) | 71 | 16 | 15 | 20 | 49 | −23 |
| 2: PPL-SBR | 58 | 15 | 14 | 21 | 51 | −23 |
| 3: ESTI-SBR | 71 | 16 | 15 | 21 | 49 | −22 |
| 4: PPL-ESTI-SBR | 64 | 15 | 14 | 20 | 51 | −22 |

[1]Vinyl content expressed as weight percent based on total polymer weight.

Example 6

This example illustrates use in a rubber compound of a functionalized SBR according to the present invention. Rubber compounds were made using SBR shown in Table 2. Each of the rubber compounds included 70 parts by weight, per hundred parts by weight of rubber (phr) of SBR, 30 phr of polybutadiene, 65 phr of silica, and standard amounts of other additives including curatives. Curative amounts were adjusted to maintain a constant crosslinking level, as indicated by the 300% modulus. The same curative amount was used in Samples 2, 3 and 4, while the amount of curative was increased slightly for the unfunctionalized SBR of Sample 1. All other additives were used in identical amounts in all samples. Rubber compounds were mixed in a 3-liter standard mixer with Banbury® rotor. Each SBR sample was mixed with additives in a three stage mix.

The compounds were tested for various physical properties as given in Table 4. As seen in Table 4 and FIG. 1, Sample 4 containing the SBR of the present invention showed an unexpectedly superior indicator of rolling resistance compare to Samples 2 and 3, as reflected in the tangent delta measured at 60 C and 5% strain. The lower tangent delta of Sample 4 indicates better rolling resistance and suggests better interaction of the bifunctionalized elastomer of Sample 4 with silica as compared with the monofunctionalized elastomers of Samples 2 or 3.

The mixed compounds were tested for viscoelastic properties with results given in Table 4. Tan delta as indicated was determined using an Alpha Technologies Rubber Process Analyzer (RPA). A description of the RPA 2000, its capability, sample preparation, tests and subtests can be found in these references. H A Pawlowski and J S Dick, Rubber World, June 1992; J S Dick and H A Pawlowski, Rubber World, January 1997; and J S Dick and J A Pawlowski, Rubber & Plastics News, Apr. 26 and May 10, 1993.

The tear resistance property (tear strength) determination is conducted for peel adhesion of a sample to another sample of the same material. A description may be found in ASTM D4393 except that a sample width of 2.5 cm is used and a clear Mylar plastic film window of a 5 mm width is inserted between the two test samples. It is an interfacial adhesion measurement (pulling force expressed in N/mm units) between two layers of the same tested compound which have been co-cured together with the Mylar film window there between. The purpose of the Mylar film window is to delimit the width of the pealed area.

Viscoelastic properties (Tan Delta) were measured using an Alpha Technologies Rubber Process Analyzer (RPA). A description of the RPA 2000, its capability, sample preparation, tests and subtests can be found in these references. H A Pawlowski and J S Dick, Rubber World, June 1992; J S Dick and H A Pawlowski, Rubber World, January 1997; and J S Dick and J A Pawlowski, Rubber & Plastics News, April 26 and May 10, 1993.

Tensile data were measured according to Automated Testing System instrument by the Instron Corporation. Such instrument may determine ultimate tensile, ultimate elongation, modulii, etc. Data reported in the Table is generated by running the ring tensile test station which is an Instron 4201 load frame.

Wear data were measured according to DIN 53516 abrasion resistance test procedure using a Zwick drum abrasion unit, model 6102 with 2.5 Newtons force. DIN standards are German test standards. The DIN abrasion results are reported as relative values to a control rubber composition used by the laboratory.

Alternatively, the Grosch abrasion rate was run on a LAT-100 Abrader and is measured in terms of mg/km of rubber abraded away. The test rubber sample is placed at a slip angle under constant load (Newtons) as it traverses a given distance on a rotating abrasive disk (disk from HB Schleifmittel GmbH). Frictional forces, both lateral and circumferential, generated by the abrading sample can be measured together with the load (Newtons) using a custom tri-axial load cell. The surface temperature of the abrading wheel is monitored during testing and reported as an average temperature. In practice, a Low abrasion severity test may be run, for example, at a load of 20 Newtons at a slip angle of 2 degrees and a disk speed of 40 kph (kilometers per hour) at a sample travel of 7,500 m. A Medium abrasion severity test may be run, for example, at a load of 40 Newtons at a slip angle of 6 degrees and a disk speed of 20 kph and a sample travel of 1,000 m. A High abrasion severity test may be run, for example, at a load of 70 Newtons at a slip angle of 12 degrees and a disk speed of 20 kph and a sample travel of 250 m.

TABLE 4

| | Sample. No | | | |
|---|---|---|---|---|
| | 1 Control | 2 | 3 | 4 |
| Functionality* | NF | FI | FT | FI + FT |
| Filler | 65 Silica | 65 Silica | 65 Silica | 65 Silica |
| Tensile/Elongation | | | | |
| Tensile Strength, MPa | 15.3 | 16.3 | 17.3 | 17.9 |
| Elongation @ break, % | 417 | 432 | 455 | 451 |
| Modulus @ 300%, MPa | 10.3 | 10.6 | 10.1 | 10.8 |
| Wet Prediction | | | | |
| 0 C. Rebound | 24 | 21 | 22 | 20 |
| TanD @ 0 C. | 0.22 | 0.15 | 0.16 | 0.15 |
| Rolling Resistance Prediction | | | | |
| Rebound, 60 C. | 55.4 | 60 | 59.4 | 61.2 |
| TanD, 60 C., 5% Str | 0.157 | 0.135 | 0.137 | 0.118 |
| Treadwear Prediction | | | | |
| Grosch Abrasion | | | | |
| Medium severity | 80 | 84 | 72 | 75 |
| High severity | 624 | 634 | 582 | 571 |
| Tear Strength, N | 51 | 51 | 58 | 64 |

*Functionality: NF = nonfunctionalized; FI = functionalized initiator; FT = functionalized terminator.

Example 7

Figure 2:
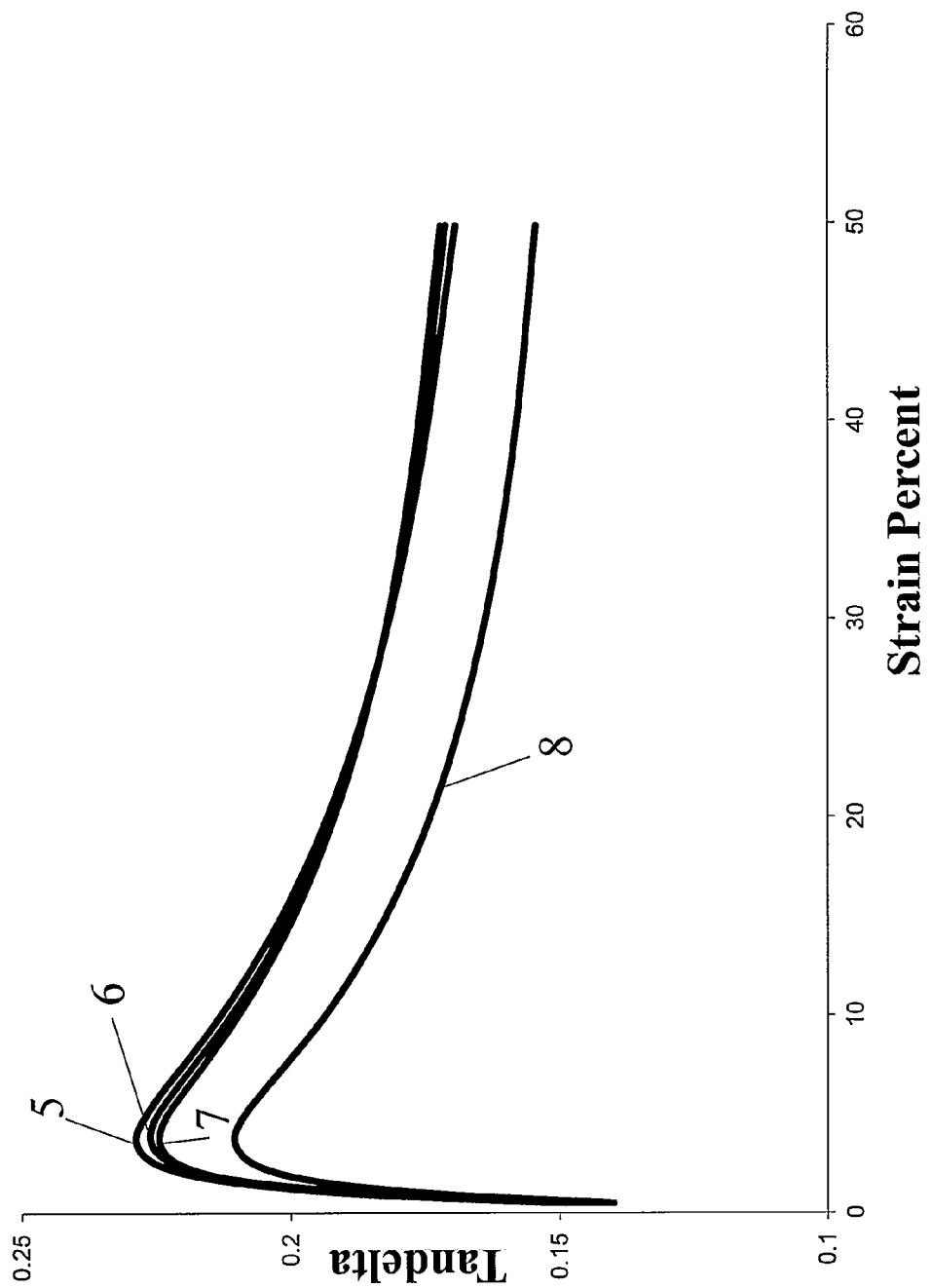
FIG. 2 shows a graph of tan delta versus strain for several rubber samples.

The procedure of Example 6 was repeated to produce compounds containing 60 phr of SBR, 40 phr of polybutadiene and 95 phr of silica. All other conditions were maintained as in Example 6. Results of physical tests on the compounds (labeled Sample No. 5-8) as shown in Table 5 and FIG. 2 again showed unexpectedly superior indicator of rolling resistance of the functionalized polymer of the present invention (Sample No. 8) compared to Samples 6 and 7, as reflected in the tangent delta measured at 60 C and 5% strain. The lower tangent delta of Sample 8 indicates better rolling resistance, and suggests better interaction of the bifunctionalized elastomer of Sample 8 with silica as compared with the monofunctionalized elastomers of Samples 6 or 7.

TABLE 5

| | Sample No. | | | |
|---|---|---|---|---|
| | 5 Control | 6 Comp | 7 Comp | 8 Invention |
| Functionality* | NF | FI | FT | FI + FT |
| Filler | 95 Silica | 95 Silica | 95 Silica | 95 Silica |
| Tensile/Elongation | | | | |
| Tensile Strength, MPa | 15 | 15.1 | 15.5 | 15.5 |
| Elongation @ break, % | 389 | 422 | 419 | 455 |
| Modulus @ 300%, MPa | 10.3 | 10.6 | 10.1 | 10.8 |
| Wet Prediction | | | | |
| 0 C. Rebound | 16 | 15 | 15.3 | 14 |
| TanD @ 0 C. | 0.168 | 0.173 | 0.189 | 0.182 |
| Rolling Resistance Prediction | | | | |
| Rebound, 60 C. | 47.3 | 46.8 | 46.3 | 47.5 |
| TanD, 60 C., 5% Str | 0.227 | 0.225 | 0.223 | 0.209 |
| Treadwear Prediction | | | | |
| DIN Abrasion | 117 | 113 | 109 | 114 |
| Tear Strength, N | 77 | 75 | 71 | 83 |

*Functionality: NF = nonfunctionalized; FI = functionalized initiator; FT = functionalized terminator.

Example 8

Figure 3:
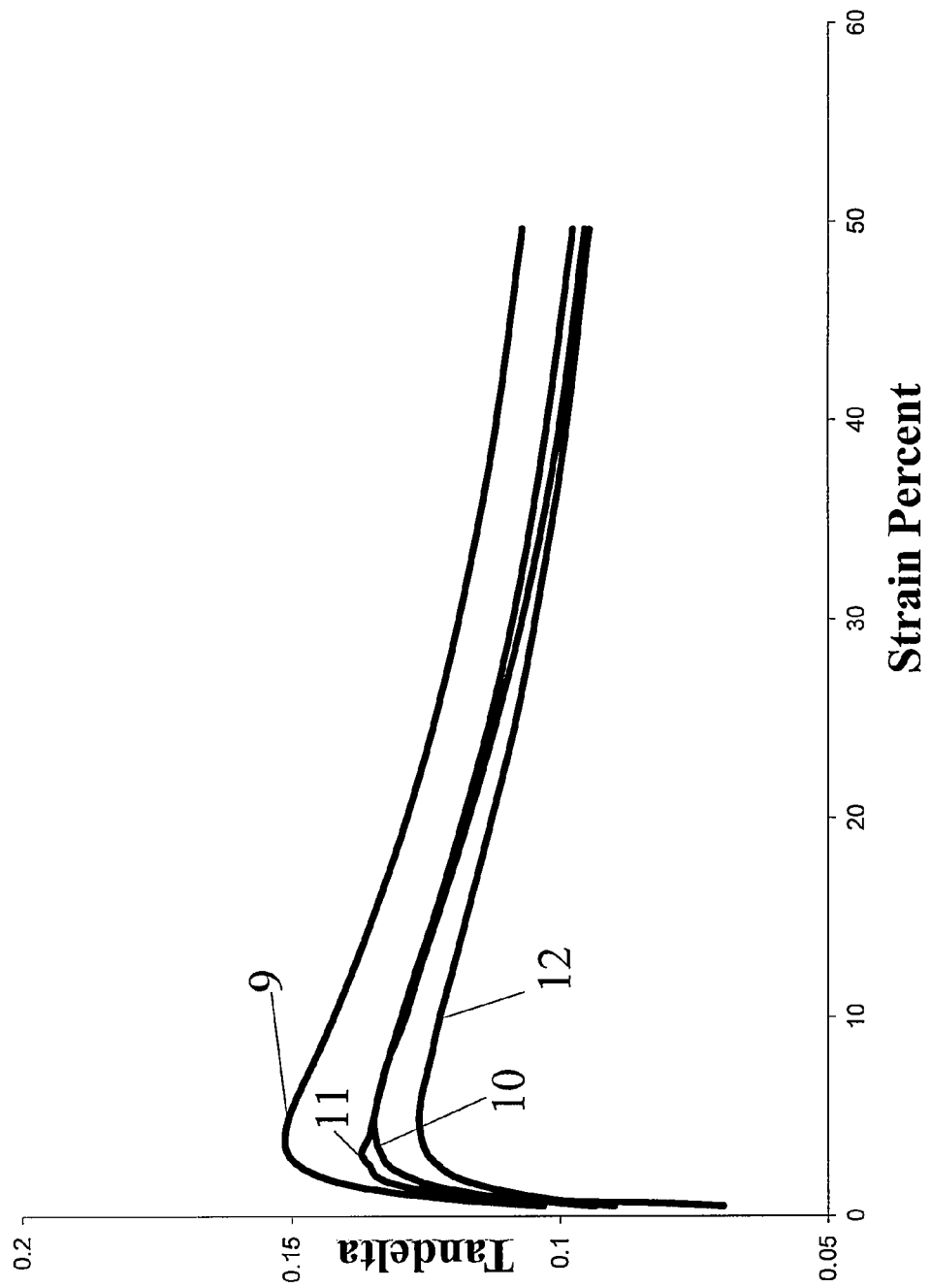
FIG. 3 shows a graph of tan delta versus strain for several rubber samples.

The procedure of Example 6 was repeated to produce compound containing 50 phr of SBR, 50 phr of natural rubber and 60 phr of silica, with the exception that all SBR contained about 18 percent styrene, ten percent vinyl, and a Tg of about −72° C. All other mixing conditions were maintained as in Example 6. Results of physical tests on the compounds (labeled Sample No. 9-12) as shown in Table 6 and FIG. 3 again showed unexpectedly superior indicator of rolling resistance of the functionalized polymer of the present invention (Sample No. 12) compared to Samples 10 and 11, as reflected in the tangent delta measured at 60 C and 5% strain. The lower tangent delta of Sample 12 indicates better rolling resistance, and suggests better interaction of the bifunctionalized elastomer of Sample 12 with silica as compared with the monofunctionalized elastomers of Samples 10 or 11.

TABLE 6

| | Sample No. | | | |
|---|---|---|---|---|
| | 9 Control | 10 Comp | 11 Comp | 12 Invention |
| NR/SBR | 50/50 | 50/50 | 50/50 | 50/50 |
| SBR Functionality* | NF | FI | FT | FI + FT |
| Filler | 60 Silica | 60 Silica | 60 Silica | 60 Silica |
| Tensile/Elongation | | | | |
| Tensile Strength, MPa | 17.6 | 19.2 | 19.8 | 19 |
| Elongation @ break, % | 496 | 505 | 522 | 486 |
| Modulus @ 300%, MPa | 10 | 10.6 | 10.4 | 10.9 |

TABLE 6-continued

|  | Sample No. | | | |
| --- | --- | --- | --- | --- |
|  | 9 Control | 10 Comp | 11 Comp | 12 Invention |
| Rolling Resistance Prediction | | | | |
| Rebound, 100 C. | 65 | 67 | 67 | 70 |
| TanD, 60 C., 5% Str | 0.15 | 0.133 | 0.139 | 0.126 |
| Tear Strength, N | 99 | 84 | 93 | 95 |

*Functionality: NF = nonfunctionalized; FI = functionalized initiator; FT = functionalized terminator.

Example 9

Figure 4:
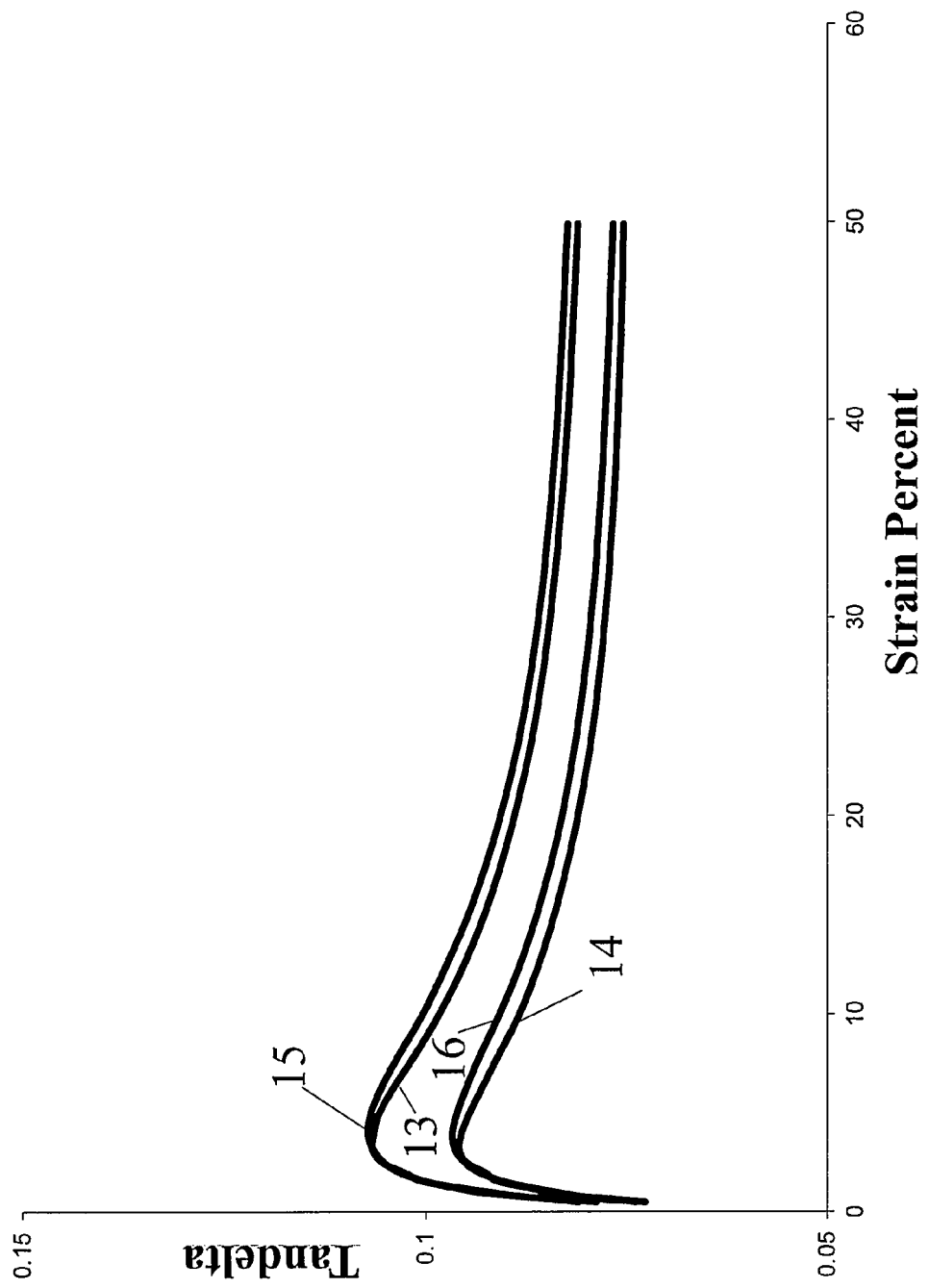
FIG. 4 shows a graph of tan delta versus strain for several rubber samples.

The procedure of Example 8 was repeated to produce compound containing 50 phr of SBR, 50 phr of natural rubber, 30 phr of silica, and 30 phr of carbon black. All other conditions were maintained as in Example 8. Results of physical tests on the compounds (labeled Sample No. 13-16) as shown in Table 7 and FIG. 4 showed comparably higher indicator of rolling resistance of the functionalized polymer of the present invention (Sample No. 16) and for the polymer functionalized only with functional initiator (Sample No. 14) compared to Sample 15, as reflected in the tangent delta measured at 60 C and 5% strain. These results suggest a weaker interaction of the bifunctionalized elastomer with the combination silica and carbon black filler, as compared with the data of Examples 6-8. Apparently, the interaction with carbon black is predominantly due to the functional initiator, while both the functional initiator and functional terminator improve the interaction of the bifunctionalized elastomer with silica.

TABLE 7

|  | Sample No. | | | |
| --- | --- | --- | --- | --- |
|  | 13 Control | 14 Comp | 15 Comp | 16 Invention |
| NR/SBR | | | | |
| SBR | 50/50 | 50/50 | 50/50 | 50/50 |
| Functionality* | NF | FI | FT | FI + FT |
| Filler | 30 Silica 30 CB | 30 Silica 30 CB | 30 Silica 30 CB | 30 Silica 30 CB |
| Tensile/Elongation | | | | |
| Tensile Strength, MPa | 19.7 | 19.5 | 20.3 | 20.1 |
| Elongation @ break, % | 495 | 482 | 502 | 479 |
| Modulus @ 300%, MPa | 10.5 | 10.6 | 10.7 | 11 |
| Rolling Resistance Prediction | | | | |
| Rebound, 100 C. | 69 | 72 | 70 | 72 |
| TanD, 90 C., 5% Str | 0.11 | 0.09 | 0.11 | 0.1 |
| Treadwear Prediction | | | | |
| DIN Abrasion | 95 | 87 | 86 | 88 |
| Tear Strength, N | 90 | 142 | 138 | 92 |

*Functionality: NF = nonfunctionalized; FI = functionalized initiator; FT = functionalized terminator.

Example 10

Figure 5:
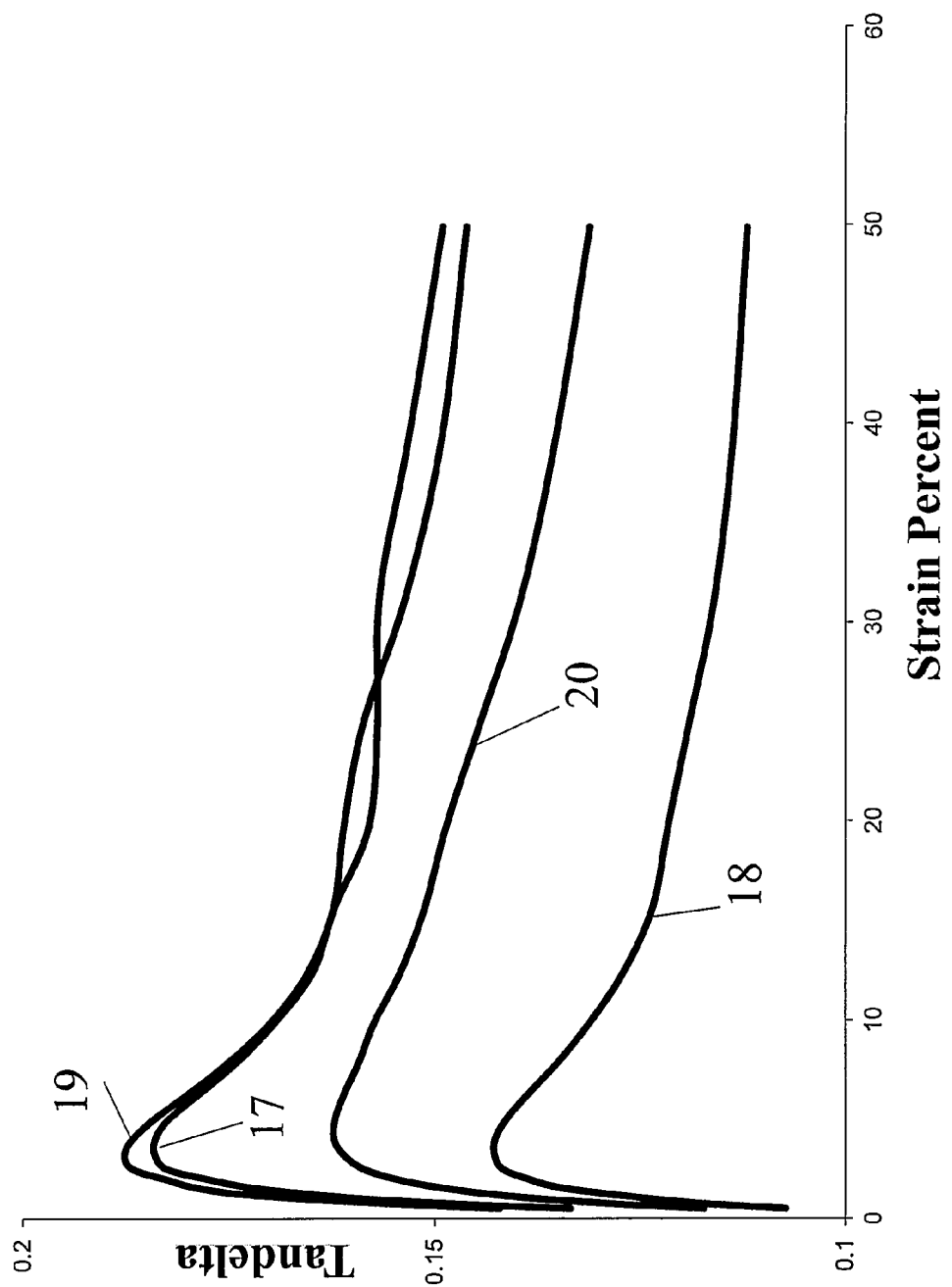
FIG. 5 shows a graph of tan delta versus strain for several rubber samples.

The procedure of Example 8 was repeated to produce compound containing 50 phr of SBR, 50 phr of natural rubber, and 60 phr of carbon black with no silica. All other conditions were maintained as in Example 8. Results of physical tests on the compounds (labeled Sample No. 5-8) as shown in Table 8 and FIG. 5 show improved rolling resistance for the polymer with functionalized initiator (Sample 18) and no improvement for the polymer with functionalized terminator (Sample 19), suggesting little to no benefit of the bifunctionalized elastomer in all carbon black rubber compounds.

TABLE 8

|  | Sample No. | | | |
| --- | --- | --- | --- | --- |
|  | 17 Control | 18 Comp | 19 Comp | 20 Invention |
| NR/SBR | | | | |
| SBR | 50/50 | 50/50 | 50/50 | 50/50 |
| Functionality* | NF | FI | FT | FI + FT |
| Filler | 60 CB | 60 CB | 60 CB | 60 CB |
| Tensile/Elongation | | | | |
| Tensile Strength, MPa | 21.9 | 20.6 | 21.7 | 18.9 |
| Elongation @ break, % | 466 | 419 | 468 | 384 |
| Modulus @ 300%, MPa | 13 | 13.7 | 12.9 | 14.2 |
| Rolling Resistance Prediction | | | | |
| Rebound, 100 C. | 62 | 65 | 60 | 65 |
| TanD, 90 C., 5% Str | 0.18 | 0.14 | 0.19 | 0.16 |
| Treadwear Prediction | | | | |
| DIN Abrasion | 73 | 73 | 77 | 78 |
| Tear Strength, N | 88 | 75 | 83 | 59 |

*Functionality: NF = nonfunctionalized; FI = functionalized initiator; FT = functionalized terminator.

In summary, the data of the examples illustrate that the bifunctionalized elastomer of the present invention shows surprisingly improved rolling resistance when used in a rubber compound with an all silica filler or a mixed silica and carbon black filler, as compared with either the terminator functionalized elastomer or the initiator functionalized elastomer. However, no benefit of the bifunctionalized elastomer is observed in rubber compounds containing an all carbon black filler, with no silica, as the functionalization due to the functional terminator apparently has little interaction with carbon black. These results support the use of the bifunctionalized elastomer an all silica or mixed silica and carbon black rubber compound, especially with a silica to carbon black weight ratio greater than or equal to one.

While certain representative embodiments and details have been shown for the purpose of illustrating the subject invention, it will be apparent to those skilled in this art that various changes and modifications can be made therein without departing from the scope of the subject invention.

What is claimed is:

1. A rubber composition comprising:
   a bifunctionalized elastomer comprising the reaction product of 1) a living anionic elastomeric polymer initiated with a functional initiator and 2) a functional polymerization terminator, wherein
   1) the living anionic elastomeric polymer initiated with a functional initiator is of formula AYLi where Y is a divalent polymer radical, Li is a lithium atom bonded to a carbon atom of Y, and A is an amine-containing radical having the formula X

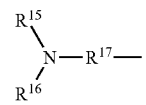

(X)

wherein $R^{15}$ and $R^{16}$ independently have from 1 to 20 carbon atoms and each are independently an alkyl group, a cycloalkyl group, an aromatic group, a substituted alkyl group, a substituted cycloalkyl group or a substituted aromatic group, or $R^{15}$ and $R^{16}$ taken together with the nitrogen to which both $R^{15}$ and $R^{16}$ are attached comprise a heterocyclic amine group wherein $R^{15}$ and $R^{16}$ taken together form an alkanediyl group of from 4 to 20 carbon atoms or a substituted alkanediyl group of from 4 to 20 carbon atoms, and $R^{17}$ is a covalent bond, an alkanediyl group of from 1 to 20 carbon atoms or a substituted alkanediyl group of from 1 to 20 carbon atoms; and 2) the functional polymerization terminator is of formula I

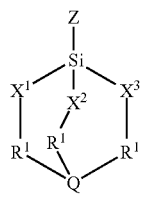

(I)

wherein $R^1$ is C1 to C4 linear alkyl, or C1 to C4 branched alkanediyl;

$X^1$, $X^2$, $X^3$ are independently O, S, or a group of formula (II) or (III)

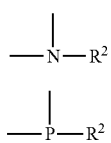

(II)

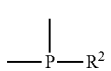

(III)

where $R^2$ is C1 to C18 linear or branched alkyl;

Z is $R^3$, —$OR^4$, or —$R^5$—$X^4$; $R^3$, $R^4$ are independently C1 to C18 linear or branched alkyl; $R^5$ is C1 to C18 alkanediyl or dialkyl ether diyl;

$X^4$ is halogen or a group of structure IV, V, VI, VII or VIII

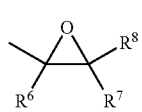

(IV)

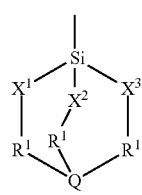

(V)

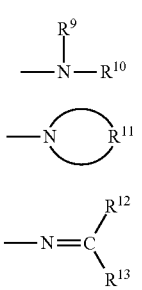

(VI)

(VII)

(VIII)

wherein $R^6$, $R^7$, $R^8$, $R^9$, and $R^{10}$ are independently H or C1 to C8 alkyl; $R^{11}$ is C2 to C8 alkanediyl; $R^{12}$ and $R^{13}$ are independently H, aryl or C1 to C8 alkyl;

Q is N or a group of structure IX

(IX)

wherein $R^{14}$ is C1 to C8 alkyl.

2. The rubber composition of claim 1, wherein the filler comprises from 10 to 100 phr of silica.

3. The rubber composition of claim 1, wherein the filler further comprises carbon black, and the weight ratio of silica to carbon black is greater than or equal to one.

4. The rubber composition of claim 1, wherein the filler comprises from 10 to 100 phr of silica, and carbon black wherein the weight ratio of silica to carbon black is greater than or equal to one.

5. The rubber composition of claim 1, further comprising at least one additional diene based elastomer selected from the group consisting of styrene-butadiene rubber, polybutadiene, natural rubber, and synthetic polyisoprene.

6. The rubber composition of claim 1, wherein the living anionic elastomer is derived from at least one diene monomer and optionally at least one vinyl aromatic monomer.

7. The rubber composition of claim 1, wherein the living anionic elastomer is derived from at least one of isoprene and butadiene, and optionally from styrene.

8. The rubber composition of claim 1, wherein the living anionic elastomer is derived from butadiene and styrene.

9. The rubber composition of claim 1, wherein the polymerization terminator of formula I is ESTI, 1-ethoxy-3,7,10-trimethylsilatrane.

10. The rubber composition of claim 1, wherein the polymerization terminator of formula I is CSTI, 1-(3-chloropropyl)-3,7,10-trimethylsilatrane.

11. The rubber composition of claim 1, wherein the polymerization terminator of formula I is BSTI, 1-isobutyl-3,7,10-trimethylsilatrane.

12. The rubber composition of claim 1, wherein the polymerization terminator of formula I is OSTI, 1-octyl-3,7,10-trimethylsilatrane.

13. The rubber composition of claim 1, wherein the polymerization terminator of formula I is BIPOS, 1,2-bis(3,7,10-trimethylsilatrane)ethane.

14. The rubber composition of claim 1, wherein the polymerization terminator of formula I is selected from the group consisting of the following structures

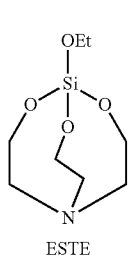 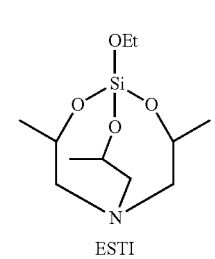 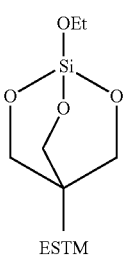

ESTE     ESTI     ESTM

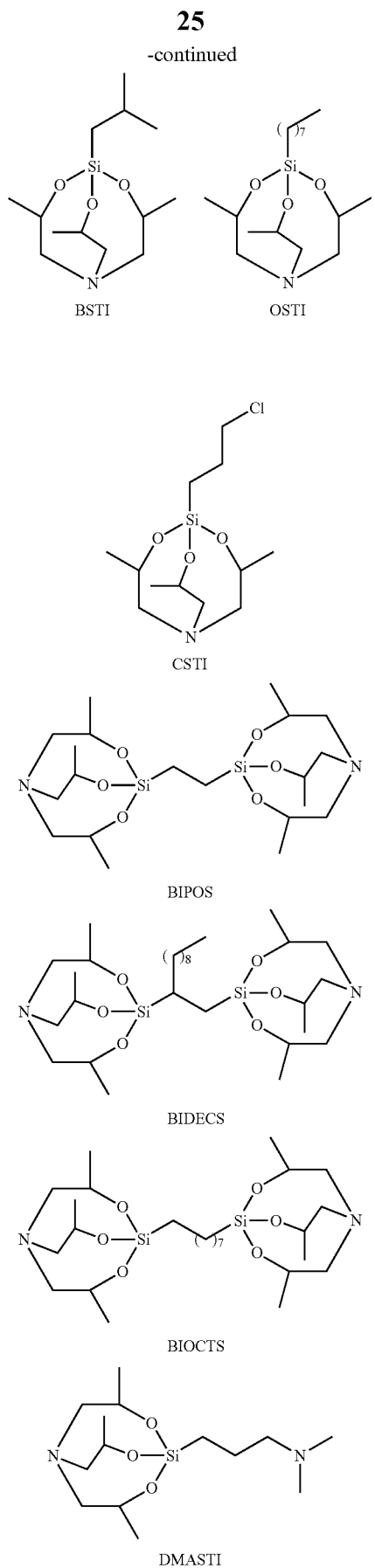
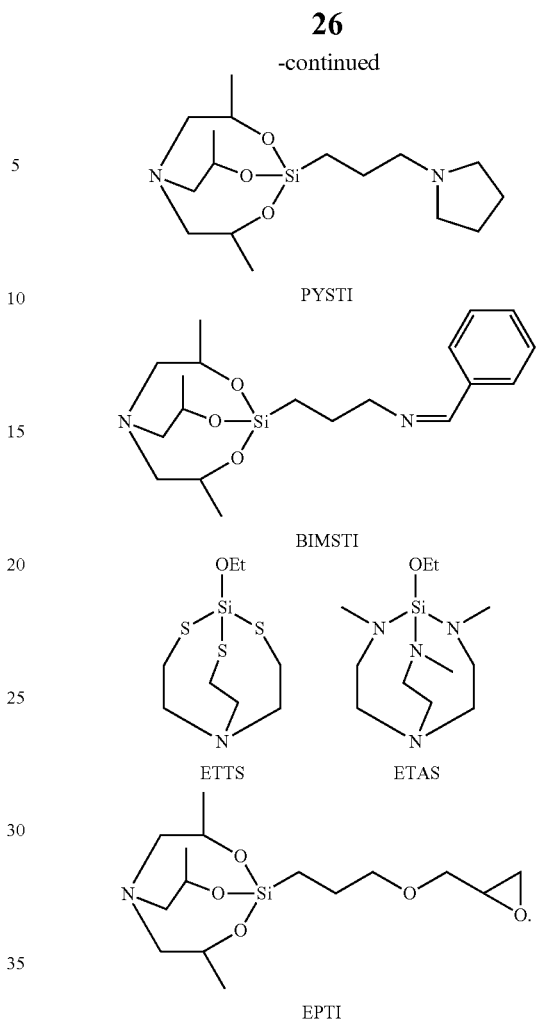
15. The rubber composition of claim 1, wherein the polymerization terminator of formula I has the structure
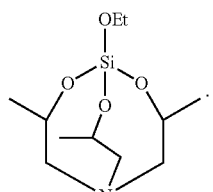
16. The rubber composition of claim 1, wherein the polymerization terminator of formula I has the structure
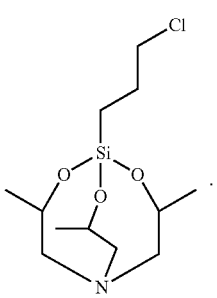

17. The rubber composition of claim 1, wherein the structure of formula X is selected from the group consisting of 3-(N,N-dimethylamino)-1-propyl, 3-(N, N-dimethylamino)-2-methyl-1-propyl, 3-(N, N-dimethylamino)-2,2-dimethyl-1-propyl, 4-(N, N-dimethylamino)-1-butyl, 5-(N, N-dimethylamino)-1-pentyl, 6-(N, N-dimethylamino)-1-hexyl, and 8-(N, N-dimethylamino)-1-propyl.

18. The rubber composition of claim 1, wherein the structure of formula X is selected from the group consisting of 3-piperidino-1-propyl and 3-pyrrolidino-1-propyl.

19. The rubber composition of claim 18, further comprising silica.

20. A pneumatic tire comprising the rubber composition of claim 19.

\* \* \* \* \*